(12) United States Patent
Smith et al.

(10) Patent No.: US 12,008,409 B1
(45) Date of Patent: Jun. 11, 2024

(54) APPARATUS AND A METHOD FOR DETERMINING RESOURCE DISTRIBUTION

(71) Applicant: Strategic Coach, Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 0 days.

(21) Appl. No.: 18/142,481

(22) Filed: May 2, 2023

(51) Int. Cl.
  *G06Q 10/06* (2023.01)
  *G06F 9/50* (2006.01)
  *G06Q 10/0631* (2023.01)

(52) U.S. Cl.
  CPC ..... *G06F 9/5027* (2013.01); *G06Q 10/06311* (2013.01); *G06Q 10/06312* (2013.01)

(58) Field of Classification Search
  CPC .................. G06Q 10/06311; G06Q 10/06312
  See application file for complete search history.

(56) References Cited

U.S. PATENT DOCUMENTS

| | | | |
|---|---|---|---|
| 11,393,577 B2 | 7/2022 | Thomas | |
| 2006/0053043 A1* | 3/2006 | Clarke | G06Q 10/10 705/7.17 |
| 2007/0276688 A1* | 11/2007 | Sun | G06Q 30/02 705/347 |
| 2016/0132802 A1* | 5/2016 | Daw | G06Q 10/06311 705/7.13 |
| 2017/0147955 A1* | 5/2017 | Ezry | G06F 16/29 |
| 2019/0385244 A1* | 12/2019 | Stelmar Netto | G06Q 10/06316 |
| 2020/0117508 A1* | 4/2020 | Subramanian | G06F 40/279 |
| 2021/0193302 A1 | 6/2021 | Day | |

(Continued)

FOREIGN PATENT DOCUMENTS

| | | | | |
|---|---|---|---|---|
| CN | 113302638 A | * | 8/2021 | ............ G06Q 10/04 |
| CN | 113302638 A | | 8/2021 | |
| WO | WO-2021248132 A1 | * | 12/2021 | ............ G06N 20/00 |

OTHER PUBLICATIONS

English translation of CN113302638A (Year: 2018).*

(Continued)

*Primary Examiner* — Mehmet Yesildag
*Assistant Examiner* — Jeremy L Gunn
(74) *Attorney, Agent, or Firm* — Caldwell Intellectual Property Law

(57) ABSTRACT

An apparatus for determining resource distribution is disclosed. The apparatus comprise at least a processor and a memory communicatively connected to the at least a processor. The memory instructs the processor to extract an entity profile from a user, wherein the entity profile comprises a plurality of function data. The memory instructs the processor to identify a plurality of resource data as a function of the entity profile. The memory instructs the processor to calculate apportionment data associated with the plurality of function data as a function of the plurality of resource data. The memory instructs the processor to generate optimized apportionment data as a function of the apportionment data and the plurality of resource data. The memory instructs the processor to determine a resource distribution as a function of the apportionment data. The memory instructs the processor to present the resource distribution using a display device.

18 Claims, 10 Drawing Sheets

(56) References Cited

U.S. PATENT DOCUMENTS

| | | | |
|---|---|---|---|
| 2021/0304003 A1* | 9/2021 | Johnson | G06F 18/217 |
| 2022/0027744 A1* | 1/2022 | Krishnan | G06Q 10/06315 |
| 2022/0309412 A1* | 9/2022 | Tomaselli | H04L 63/102 |
| 2022/0383225 A1 | 12/2022 | Berkowitz | |
| 2023/0214736 A1* | 7/2023 | Stavarache | G06Q 10/06375 705/7.14 |

OTHER PUBLICATIONS

Z. Huang, X. Lu and H. Duan, "A Task Operation Model for Resource Allocation Optimization in Business Process Management," in IEEE Transactions on Systems, Man, and Cybernetics—Part A: Systems and Humans, vol. 42, No. 5, pp. 1256-1270, Sep. 2012, doi: 10.1109/TSMCA.2012.2187889 (Year: 2012).*

* cited by examiner

APPARATUS AND A METHOD FOR DETERMINING RESOURCE DISTRIBUTION

FIELD OF THE INVENTION

The present invention generally relates to the field of artificial intelligence. In particular, the present invention is directed to an apparatus and a method for determining resource distribution.

BACKGROUND

Apportionment of resources is a non-trivial problem for data processing systems. The various potential combinations and the lack of adequate boundary conditions can frustrate efficient processing.

SUMMARY OF THE DISCLOSURE

In an aspect, an apparatus for determining resource distribution is disclosed. The apparatus comprises at least a processor and a memory communicatively connected to the at least a processor. The memory instructs the processor to extract an entity profile from a user, wherein the entity profile comprises a plurality of function data. The memory instructs the processor to identify a plurality of resource data as a function of the entity profile. The memory instructs the processor to calculate apportionment data associated with the plurality of function data as a function of the plurality of resource data. The memory instructs the processor to generate optimized apportionment data as a function of the apportionment data and the plurality of resource data. Determining the optimized apportionment data includes identifying at least one constraint associated with the apportionment data and the plurality of resource data using a constraint machine learning model and generating the optimized apportionment data as a function of the at least one constraint. The memory instructs the processor to determine a resource distribution as a function of the apportionment data. The memory instructs the processor to display the resource distribution using a display device.

In another aspect, a method for determining resource distribution is disclosed. The method includes extracting, using at least a processor, an entity profile from a user, wherein the entity profile comprises a plurality of function data. The method includes identifying, using the at least a processor, a plurality of resource data as a function of the entity profile. The method includes calculating, using the at least a processor, apportionment data associated with the plurality of function data as a function of the plurality of resource data. The method includes generating, using the at least a processor, optimized apportionment data as a function of the apportionment data and the plurality of resource data. Determining the optimized apportionment data includes identifying at least one constraint associated with the apportionment data and the plurality of resource data using a constraint machine learning model and generating the optimized apportionment data as a function of the at least one constraint. The method includes determining, using the at least a processor, a resource distribution as a function of the apportionment data. The method includes displaying using the display device the resource distribution.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus for determining resource distribution is disclosed. The apparatus comprises at least a processor and a memory communicatively connected to the at least a processor. The memory instructs the processor to extract an entity profile from a user, wherein the entity profile comprises a plurality of function data. The memory instructs the processor to identify a plurality of resource data as a function of the entity profile. The memory instructs the processor to calculate apportionment data associated with the plurality of function data as a function of the plurality of resource data. The memory instructs the processor to generate optimized apportionment data as a function of the apportionment data and the plurality of resource data. Determining optimized apportionment data includes identifying at least one constraint associated with the apportionment data and the plurality of resource data using a constraint machine learning model and generating the optimized apportionment data as a function of the at least one constraint. The memory instructs the processor to determine a resource distribution as a function of the apportionment data. The memory instructs the processor to display the resource distribution using a display device. Exemplary embodiments illustrating aspects of the present disclosure are described below in the context of several specific examples.

Figure 1:
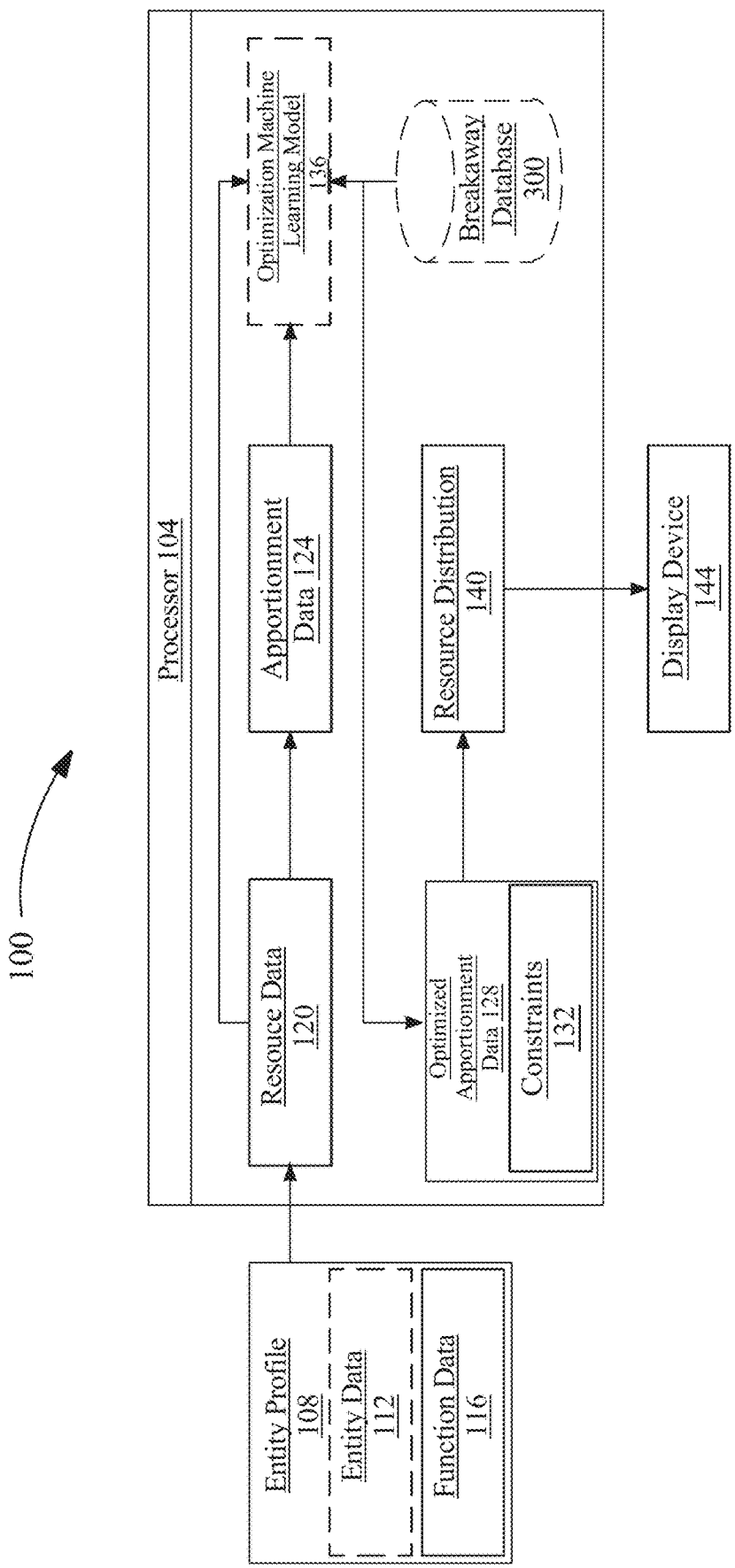
FIG. 1 is a block diagram of an exemplary embodiment of an apparatus for determining resource distribution.

Referring now to FIG. 1, an exemplary embodiment of apparatus 100 for determining resource distribution is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of system 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, as used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, apparatus, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example, and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, without limitation, via a bus or other facility for intercommunication between elements of a computing device. Communicative connecting may also include indirect connections via, for example, and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 104 may be configured to extract an entity profile 108 from a user. For the purposes of this disclosure, an "entity profile" is a data structure representing an entity. An entity profile 108 may be made up of a plurality of entity data 112. As used in the current disclosure, "entity data" is information associated with the entity. As used in the current disclosure, an "entity" is an organization comprised of one or more persons with a specific purpose. An entity may include a corporation, organization, business, group, and the like. An entity profile 108 may be created by a processor 104, a user, or a third party. As used in the current disclosure, a "user" is an authoritative figure within the entity. The user may include a manager, owner, or shareholder of the entity. The entity profile 108 may information regarding the entity's revenue, gross income, net income, business debts, a list of business expenses, current inventory, inventory history, sales information, human resource information, employee information, employee salaries, time cards, a list of company assets, a list of capital projects, accounting information, and the like.

With continued reference to FIG. 1, entity profile 108 may include function data 116. As used in the current disclosure, "function data" is data associated with the action performed by an employee for the furtherance of the purpose of the entity. As used in the current disclosure, a "function" is a task/action performed by an employee or user for the furtherance of the purpose of the entity. Function data 116 may comprise employee function data, owner function data, manager function data, and the like. Function data 116 may describe the responsibilities of an employee, manager, or owner. Function data 116 may represent internal or external tasks as it relates to the entity. Examples of function data 116 may include but are not limited to data describing managerial responsibilities, providing a service, making goods, maintaining a facility, interfacing with clients, accounting activities, product selection, ordering inventory, hiring/firing of employees, employee management, resource management, assigning tasks, and the like. Function data 116 may additionally be organized by time. In a non-limiting example, the function data 116 of an employee may include facility maintenance, preparing goods, and organizing the goods once they are prepared. In another non-limiting example, an entity may have to accomplish the following task in a given day: provide 10 customers with a service, interface with clients, prepare goods, and store goods within a working day. Function data 116 may describe all of the tasks and sub-tasks associated with the entity model. Function data 116 may be entered into processor 104 by a user. Processor 104 may additionally be configured to generate a list of functions based on the purpose of the entity, job descriptions of the employee, the number of goods promised, the number of services to be provided, and the like. This may be done using a machine learning model or fuzzy inference set.

With continued reference to FIG. 1, an entity profile 108 may be received by processor 104 via user input. For example, and without limitation, the user or a third party may manually input entity profile 108 using a graphical user interface of processor 104 or a remote device, such as for example, a smartphone or laptop. The entity profile 108 may additionally be generated via the answer to a series of questions. The series of questions may be implemented using a chatbot, as described herein below. A chatbot may be configured to generate questions regarding any element of the entity profile 108. In a non-limiting embodiment, a user may be prompted to input specific information or may fill out a questionnaire. In an embodiment, a graphical user interface may display a series of questions to prompt a user for information pertaining to the entity profile 108. The entity profile 108 may be transmitted to processor 104, such as via a wired or wireless communication, as previously discussed in this disclosure. The entity profile 108 can be retrieved from multiple sources third-party sources including the user's inventory records, financial records, human resource records, past entity profiles 108, sales records, user notes and observations, job descriptions, and the like. An entity profile may be placed through an encryption process for security purposes.

With continued reference to FIG. 1, an entity profile 108 may include entity records. As used in the current disclosure, an "entity record" is a document that contains information regarding the entity. Entity records may include employee credentials, reports, financial records, medical records, business records, Asset inventory, sales history, sales predictions, and government records (i.e. birth certificates, social security cards, and the like). An entity record may additionally include an employee record. An employee record may include things like employee evaluations, human resource records, client files, invoices, time cards, driver's license databases, news articles, social media profiles and/or posts, and the like. Entity records may be identified using a web crawler. Entity records may include a variety of types of "notes" entered over time by the user, employees of the user, support staff, advisors, and the like. Entity records may be converted into machine-encoded text using an optical character reader (OCR).

Still referring to FIG. 1, in some embodiments, optical character recognition or optical character reader (OCR) includes automatic conversion of images of written (e.g., typed, handwritten, or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases, OCR may be an "offline" process, which analyses a static document or image frame. In some cases, handwriting movement analysis can be used as input for handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image components. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to the image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from the background of the image component. In some cases, binarization may be required for example if an employed OCR algorithm only works on binary images. In some cases, a line removal process may include the removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify a script allowing an appropriate OCR algorithm to be selected. In some cases, a character isolation or "segmentation" process may separate signal characters, for example, character-based OCR algorithms. In some cases, a normalization process may normalize the aspect ratio and/or scale of the image component.

Still referring to FIG. 1, in some embodiments, an OCR process will include an OCR algorithm. Exemplary OCR algorithms include matrix-matching process and/or feature extraction processes. Matrix matching may involve comparing an image to a stored glyph on a pixel-by-pixel basis. In some cases, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at the same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 5-7. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. The second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIGS. 2, 4, and 5.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make use of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, entity profile 108 may be generated using a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, processor 104 may generate a web crawler to compile the entity profile 108 and entity data 112. The web crawler may be seeded and/or trained with a reputable website, such as the user's business website, to begin the search. A web crawler may be generated by a processor 104. In some embodiments, the web crawler may be trained with information received from a user through a user interface. In some embodiments, the web crawler may be configured to generate a web query. A web query may include search criteria received from a user. For example, a user may submit a plurality of websites for the web crawler to search to extract entity records, inventory records, financial records, human resource records, past entity profiles 108, sales records, user notes, and observations, based on criteria such as a time, location, and the like.

Continuing to refer to FIG. 1, in an embodiment, processor 104 may be configured to generate personnel data as a function of entity data 112. As used in the current disclosure, "personnel data" is an element of data related to the personnel of the entity. Personnel data may be received from a personnel database, wherein the personnel may be the same or substantially similar to database 300. Personnel data may include a list of all employees associated with an entity. Personnel data may additionally include a listing of all of the credentials and experience associated with the employees. Personnel data may include a listing of functions that are completed by an employee, this may also include completion times associated with those functions. In embodiments, determining personnel data may include an identification of current roles associated with the employee. A "current role," as used herein, is an aggregate of functions that an employee performs regularly. In a non-limiting example, the current role may include yard landscaping, which may include tasks such as raking, lawn mowing, and the like. In another non-limiting example, the current role may include a dog walker, which may include tasks such as walking dogs, picking up dogs from the user's residence and returning them, bringing a user's dog to the dog park, and the like. Associations between function data 116 and current roles may be performed using a machine learning model. Associations between functions and current roles may be performed using any algorithm and/or methodology described in reference to the entirety of this disclosure. It will become apparent to a person of ordinary skill in the art, upon reading this disclosure, the many tasks that may be associated with roles and that two or more roles may have overlapping tasks associated with them.

With continued reference to FIG. 1, processor 104 is configured to identify a plurality of resource data 120 as a function of the entity profile 108. As used in the current disclosure, "resource data" is an element of data associated with the resources of the entity. A resource may include anything an entity uses to complete tasks, functions, or projects associated with the entity. Resources may include monetary resources, time, equipment, personnel, services, products, goods, and the like. Resource data 120 may be represented as the total amount of resources available to the entity at a given time. Resource data 120 may be calculated by identifying the quantity of available personnel, equipment, and facilities that are available to the entity and the time for which those resources are available. In some embodiments, if a resource has been previously consumed or has plans to be consumed the resource may be considered unavailable. In a non-limiting example, resource data 120 may indicate that a company has 5 employees and 3 pieces of equipment available for 100 hours each over a two-week span. If an entity plans to have 3 employees use 3 pieces of equipment for 100 hours each during that span. Resource data 120 may indicate that the available resources are 200 hours from two employees. Resource data 120 may be represented as an aggregate of the time, money, personnel, and equipment that will be needed to complete a task or function. In a non-limiting example, resource data 120 may include the number of employees and equipment for one workday. Resource data 120 may additionally be represented as the cost of the resources. In continuance of the above example, resource data 120 may be represented in monetary terms by calculating the salary of the employees for one day along with the cost to use the equipment for a day. Resources may include inventory, monetary resources, number of employees, employee skill level, employee time, equipment, equipment time, and the like. A resource data 120 may also include a time cost. As used in the current disclosure, a "time cost" is the amount of time that it will take to complete a task associated with function data along with the monetary value of the time. In some embodiments, one employee's time may hold a greater monetary value than another employee's time. The value of an employee's time may be determined by job title, seniority, credentials, experience, and the like. In a non-limiting example, a CEO who has 25 years of experience's time may be valued at $1000 per hour, as compared to a recent college graduate whose time may be valued at $100 per hour. Processor 104 may be configured to calculate resource data 120 as a function of the personnel data and the function data 116. In some embodiments, an element of resource data 120 may include outlier clusters representing areas of particular competence and/or efficiency associated with personnel. In a non-limiting example, the outlier clusters may be the same or substantially the same as the outlier clusters described in U.S. patent application Ser. No. 18/141,320, filed on Apr. 28, 2023, titled "METHOD AND AN APPARATUS FOR ROUTINE IMPROVEMENT FOR AN ENTITY," which is incorporated by reference herein in its entirety.

With continued reference to FIG. 1, processor 104 is configured to determine apportionment data 124 associated with the plurality of function data 116 as a function of the plurality of resource data 120. "Apportionment data," as used in this disclosure, is data associated with the quantity of resources needed to complete a task represented by the function data 116. Apportionment data 124 may include the time cost associated with a task associated with function data 116. In a non-limiting example, apportionment data 124 may indicate that an employee should spend three hours on a task for them to be completed efficiently. An "estimated completion time," as used herein, is an estimation of how long a task associated with function data 116 will take to be completed. In some embodiments, estimated completion time may be stored in a database, such as database 300. In some embodiments, processor 104 may estimate the completion time for a function querying a database, where the database includes completion times for other users and/or personnel. In an embodiment, processor 104 may estimate the completion time for a function based on a plurality of queried completion times. In a non-limiting example, processor 104 may query a database for the completion time for a task, where the task may have different completion times for each person in the database. In this non-limiting example, processor 104 may be configured to generate an estimated completion time by averaging the different completion times received. It will be apparent to one of ordinary skill, upon reading this disclosure, of the many methodologies that can be used to ascertain an estimated completion time for a function. In an embodiment, apportionment data 124 may be represented by the intersection of two fuzzy sets, as described in further detail below. For instance, and without limitation, the fuzzy set may include a center and/or centroid at a most likely and/or desirable value, a range weighted by the skill and experience of the employee. Weighting may be tuned according to one or more machine-learning processes as described in further detail below. In an embodiment, weighting may be represented by a membership function curve, for which higher values may represent a greater degree of membership in a fuzzy set, while lower values represent a lower degree of membership therein.

With continued reference to FIG. 1, a processor 104 may determine apportionment data 124 using a lookup table. A "lookup table," for the purposes of this disclosure, is a data structure, such as without limitation an array of data, that maps input values to output values. A lookup table may be used to replace a runtime computation with an indexing operation or the like, such as an array indexing operation. A look-up table may be configured to pre-calculate and store data in static program storage, calculated as part of a program's initialization phase or even stored in hardware in application-specific platforms. Data within the lookup table may include previous examples of apportionment data 124 compared to function data 116. Data within the lookup table may be received from database 300. Lookup tables may also be used to identify apportionment data 124 by matching an input value to an output value by matching the input against a list of valid (or invalid) items in an array. In a non-limiting example, function data 116 may that an entity has to accomplish Task 1. Examples of apportionment data 124 may indicate that the completion time for Task 1 has historically been between 45 minutes and 1 hour when completed by an experienced employee whereas it takes nearly 2 hours when completed by a new employee. A lookup table may look up the user's function data 116 and personnel data as inputs and output apportionment data 124 indicating that the employee should complete the task in 1 hour and 20 minutes. Processor 104 may be configured to "lookup" or input one or more function data 116, entity data 112, personnel data, examples of apportionment data 124, and the like. Whereas the output of the lookup table may comprise apportionment data 124. Data from the lookup table may be compared to examples of apportionment data 124, for instance, and without limitation using string comparisons, numerical comparisons such as subtraction operations, or the like; discrepancies may indicate data faults. Alternatively or additionally, a query representing elements of apportionment data 124 may be submitted to the lookup table and/or a database, and an associated data fault identifier stored in a data record within the lookup table and/or database may be retrieved using the query.

With continued reference to FIG. 1, a processor 104 may be configured to generate an optimized apportionment data 128 as a function of the apportionment data 124 and the resource data 120. As used in the current disclosure, "optimized apportionment data" is the ideal allocation of all operational functions. An ideal allocation may be considered the allocation all operational functions to employee's other than the user. As used in the current disclosure, "operational functions" are the activities that an entity and its employees engage in on a regular basis to further the purpose of the entity. Operational functions may additionally be described as lower level non-managerial tasks. Examples of operational functions may include providing services, producing goods, delivering goods, maintaining equipment, maintaining facilities, janitorial services, non-skilled labor, skilled labor, physical labor, making deliveries, and the like. The determination of an optimized apportionment data 128 may include comparison of the apportionment data 124 and the resource data 120. The apportionment data 124 may be compared to the resource data 120 to determine if the function data 116 assigned to the user is an assignable function. An "assignable function," as used herein, is a function that can be performed by another individual other than the user. In some embodiments, determining at least an assignable function may include identifying a time deficit for each function from plurality of function data 116, wherein identifying time deficit includes comparing estimated completion time to the average employee's completion time for each function associated with the function data 116. A "time deficit," as used herein, is the additional time an employee takes to complete a task as compared to the estimated completion time of that task. In an embodiment, time deficit may be identified by subtracting estimated completion time from the employee's completion time or the user's completion time. It will be apparent to someone of ordinary skill in the art, upon reading this disclosure, the many methodologies that can be used for identifying time deficits. In an embodiment, determining at least an optimized apportionment data 128 may include ranking a ranking of the function data 116 as a function of time deficit. In some embodiments, processor 104 may use a scoring function for ranking the function data 116. For example, without limitations, processor 104 may assign scores based on time deficit, where the higher the time deficit the lower the score. In some embodiments, processor 104 may determine assignable functions for all tasks with a time deficit above a set threshold. In a non-limiting example, a set threshold may be a set of minutes, such as a threshold of mins. In a further nonlimiting example, processor 104 may determine all tasks with a time deficit of 20 minutes or more as assignable functions. In an embodiment, processor 104 may determine only the function with the highest time deficit as at least an assignable function. Ranking and scoring algorithms are discussed in more detail further below.

Continuing in reference to FIG. 1, "constraint," as used herein refers to a barrier, limitation, consideration, or any other constraint pertaining to resource utilization or planning. Constraint 132 may alter the time and/or resources available to perform a task or it may alter the concurrent and/or sequential ordering of tasks in a function order, and/or may alter the feasibility of combining a plurality of tasks. Constraints 132 may be identified by an optimization process such as the optimization of apportionment data 128. Constraints 132 may be generated using previous iterations of constraints 132 and optimized apportionment data 128. A constraint may, for instance, and without limitation, only appear during a particular optimized listing of a task represented by function data 116, wherein a second listing of the same elements in a different ordering may not show the same constraint 132. In non-limiting illustrative examples, a constraint may be a resource constraint, wherein dedicating an individual to a series of tasks for preparing a meal would then place a constraint 132 on preparing a second meal with said individual or performing a second combination of tasks; likewise a constraint 132 may be a time constraint wherein the maximal time allotted for selecting tasks for an individual or set of individuals working in tandem in preparing a meal may be dictated by when a customer places an order, whether a customer is dine-in or take-out, delivery method for the meal, and/or type of meal and ingredients used. Constraints 132 may refer to customer/user preferences. Such information may be stored and/or retrieved by a processor 104 from a database. A constraint 132 may include qualifications and/or certifications related to an employee of the user. For example, a constraint to the use of a forklift may include: 1. An employee available to use the forklift and 2. That employee is certified to use the forklift.

Continuing in reference to FIG. 1, processor 104 may select generate optimized apportionment data 128 that satisfies the plurality of constraints 136 using an objective function. An "objective function," as used in this disclosure, is a mathematical function with a solution set including a plurality of data elements to be compared, including resource data 120 and apportionment data 124. The objective function generates an output scoring optimized apportionment data 128 combinations according to at least a with the goal to minimize institutional tasks performed by the user. Processor 104 may compute a score, metric, ranking, or the like, associated with each resource data 120 and apportionment data 124 and select optimized apportionment data 128 to minimize and/or maximize the score, depending on whether an optimal result is represented, respectively, by a minimal and/or maximal score; an objective function may be used by processor 104 to score each possible pairing. An objective function may be based on one or more objectives or constraints 136, as described below. Processor 104 may pair a combination of resources allotted to the availability of the tasks or sets of tasks, that optimize the objective function. In various embodiments, a score of optimized apportionment data 128 may be based on a combination of one or more factors, including a plurality of constraints 136 and/or the number of operational functions assigned to the user. Each factor may be assigned a score based on predetermined variables.

Optimization of an objective function with a solution set including the optimized apportionment data 128 may include performing a greedy algorithm process, where optimization is performed by minimizing and/or maximizing the output of an objective function through a selection of inputs such as task combinations. A "greedy algorithm" is defined as an algorithm that selects locally optimal choices, which may or may not generate a globally optimal solution. For instance, processor 104 may select objectives so that scores associated therewith are the best score for each goal. For instance, in the non-limiting illustrative example, optimization may determine the combination of routes for a courier such that each delivery pairing includes the highest score possible, and thus the most optimal delivery.

Still referring to FIG. 1, the objective function may be formulated as a linear objective function, which processor 104 may optimize using a linear program such as without limitation a mixed-integer program. A "linear program," as used in this disclosure, is a program that optimizes a linear objective function, given at least a constraint; a linear program may be referred to without limitation as a "linear optimization" process and/or algorithm. For instance, in non-limiting illustrative examples, a given constraint might be a personnel constraint, and a linear program may use a linear objective function to calculate a minimized time per task without sacrificing the quality of the tasks. In various embodiments, apparatus 100 may determine a set of instructions towards achieving a user's optimal resource distribution that maximizes a total score subject to a constraint that there are other competing objectives. A mathematical solver may be implemented to solve for the set of instructions that maximizes scores; a mathematical solver may be implemented on processor 104 and/or another device in apparatus 100, and/or may be implemented on a third-party solver.

With continued reference to FIG. 1, generating an objective function of optimized apportionment data 128 may include minimizing a loss function, where a "loss function" is an expression of an output of which a ranking process minimizes to generate an optimal result. As a non-limiting example, processor 104 may assign variables relating to a set of parameters, which may correspond to score components as described above, calculate an output of mathematical expression using the variables, and select an objective that produces an output having the lowest size, according to a given definition of "size," of the set of outputs representing each of plurality of candidate ingredient combinations; size may, for instance, included absolute value, numerical size, or the like. Selection of different loss functions may result in the identification of different potential pairings as generating minimal outputs.

With continued reference to FIG. 1, processor 104 may identify a constraint 132 using a constraint machine-learning model. As used in the current disclosure, a "constraint machine-learning model" is a machine-learning model that sorts inputs into categories or bins of data, outputting the categories or bins of data and/or labels associated therewith. The constraint machine-learning model may be consistent with the classifier or machine-learning model described below in FIG. 2. Inputs to the constraint machine-learning model may include entity profile 108, entity data 112, function data 116, resource data 120, apportionment data 124, examples of optimized apportionment data 128, operational functions, function rank, assignable function, historical constraints 132, and the like. Outputs to the constraint machine-learning model may include an identification of a constraint 132. Constraint training data is a plurality of data entries containing a plurality of inputs that are correlated to a plurality of outputs for training a processor by a machine-learning process to correlate apportionment data 124 to historical constraints 132. Historical constraints 132 may include constraints 132 that have been encountered by previous iterations of the machine learning model. Constraint training data may be received from database 300. Constraint training data may contain information entity profile 108, entity data 112, function data 116, resource data 120, apportionment data 124, examples of optimized apportionment data 128, operational functions, function rank, assignable function, historical constraints 132, and the like. Constraint training data may correlate apportionment data 124 to historical constraints 132. Classification may be performed using, without limitation, fuzzy inference sets, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 1, processor 104 may be configured to determine if a task is an assignable function as a function of a function rank. In an embodiment, processor 104 may be configured to determine if a task is an assignable task if the function rank is below a predetermined threshold. As used in the current disclosure, a "function rank" is a scoring of the significance of a task associated with function data 116. The significance of the function data 116 may be related to the difficulty or importance of the task. In a non-limiting example, a function rank may denote the ability of an employee to accomplish a task. A function rank may be calculated using a numerical scale. A non-limiting example, of a numerical scale, may include a scale from 1-10, 1-100, 1-1000, and the like, wherein a rating of 1 may represent an insignificant task, whereas a rating of 10 may represent a highly significant task. A function rank may be generated from function data 116, personnel data, and the like. In a non-limiting example, a function rank may reflect the amount of the reduction compared to the degree of likelihood of a reduction of a medical bill. A function rank may be generated using a machine learning model. The machine learning model may be trained using rank training data. Rank training data may include a plurality of data entries containing a plurality of inputs that are correlated to a plurality of outputs for training a processor by a machine-learning process to classify function data 116 to an example of a function rank. Rank training data may comprise data entries correlating function data 116 to an example of a function rank. Rank training data may be received from database 300. Rank training data may contain information about entity profile 108, entity data 112, personnel data, function data 116, examples of function rankings, and the like. Rank training data may additionally be generated from any historical versions of any data described herein.

With continued reference to FIG. 1, processor 104 may generate an optimized apportionment data 128 using an optimization classifier 136. As used in the current disclosure, an "optimization classifier" is a machine-learning model that sorts inputs into categories or bins of data, outputting the categories or bins of data and/or labels associated therewith. The optimization classifier 136 may be consistent with the classifier or machine learning model described below in FIG. 2. Inputs to the optimization classifier 136 may include entity profile 108, entity data 112, function data 116, resource data 120, apportionment data 124, examples of optimized apportionment data 128, operational functions, function rank, assignable function, and the like. Outputs to the optimization classifier 136 may include optimized apportionment data 128. Optimization training data is a plurality of data entries containing a plurality of inputs that are correlated to a plurality of outputs for training a processor by a machine-learning process to classify apportionment data 124 and resource data 120 to examples of optimized apportionment data 128. Optimization training data may be received from database 300. Optimization training data may contain information about entity profile 108, entity data 112, function data 116, resource data 120, apportionment data 124, examples of optimized apportionment data 128, operational functions, function rank, assignable function, and the like. Outputs to the optimization classifier 136 may include optimized apportionment data 128. Optimization training data may correlate apportionment data 124 and resource data 120 to examples of optimized apportionment data 128. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 1, a machine-learning model, such as an optimization classifier 136, may be implemented as a fuzzy inferencing system. As used in the current disclosure, a "fuzzy inference" is a method that interprets the values in the input vector (i.e., apportionment data 124 and resource data 120.) and, based on a set of rules, assigns values to the output vector. A set of fuzzy rules may include a collection of linguistic variables that describe how the system should make a decision regarding classifying an input or controlling an output. An example of linguistic variables may include variables that represent one or more optimized apportionment data 128. Examples of linguistic variables may include terms such as "Full-Time Operational Functions," "Part-Time Operational Functions," and "No Operational Functions." Apportionment data 124 and resource data 120 may each individually represent a fuzzy set. The optimized apportionment data 128 may be determined by a comparison of the degree of match between a first fuzzy set and a second fuzzy set, and/or single values therein with each other or with either set, which is sufficient for purposes of the matching process.

Still referring to FIG. 1, the optimized apportionment data 128 may be determined as a function of the intersection between two fuzzy sets. Ranking the optimized apportionment data 128 may include utilizing a fuzzy set inference system as described herein below, or any scoring methods as described throughout this disclosure. For example, without limitation processor 104 may use a fuzzy logic model to determine an optimized apportionment data 128 as a function of fuzzy set comparison techniques as described in this disclosure. In some embodiments, each piece of information associated with a plurality of apportionment data 124 may be compared to a plurality of resource data 120, wherein the optimized apportionment data 128 may be represented using a linguistic variable on a range of potential numerical values, where values for the linguistic variable may be represented as fuzzy sets on that range; a "good" or "ideal" fuzzy set may correspond to a range of values that can be characterized as ideal, while other fuzzy sets may correspond to ranges that can be characterized as mediocre, bad, or other less-than-ideal ranges and/or values. In embodiments, these variables may be used to compare a plurality of apportionment data 124 may be compared to a plurality of resource data 120 with the goal of determining the optimized apportionment data 128 specific to the entity profile 108. A fuzzy inferencing system may combine such linguistic variable values according to one or more fuzzy inferencing rules, including any type of fuzzy inferencing system and/or rules as described in this disclosure, to determine a degree of membership in one or more output linguistic variables having values representing ideal overall performance, mediocre or middling overall performance, and/or low or poor overall performance; such mappings may, in turn, be "defuzzified" as described in further detail below to provide an overall output and/or assessment.

With continued reference to FIG. 1, processor 104 may be configured to predict a breakaway point as a function of the optimized apportionment data 128. As used in current disclosure, a "breakaway point" is the point in time wherein the user is relieved of their operational functions to focus on other facets of the business. The user may be described as an upper level employee including executives, owners, significant equity holders, management, and the like. In some embodiments, the breakaway point may additionally be described as the point time that the user no longer needs to be involved the business. The breakaway point may additionally include the point in time that the business is self-sustaining requiring minimal interactions from the user. A breakaway point may also include the time period wherein the user's time cost is too high to perform operational functions. In an embodiment, a breakaway point maybe when the user's time is better suited performing managerial functions vs operational functions. In a non-limiting example, entity data 112 indicates that the entity has doubled the amount of services they provide over the last year, wherein the user has also been providing services. Processor 104 may identify that the breakaway point is when the growth of the entity increases 150 percent from its current state. Processor 104 may use the determination of the optimized apportionment data 128 to predict the breakaway point. The optimized apportionment data 128 may provide a goal or a target for the entity to accomplish, whereas the breakaway point is a prediction of when entity will reach that goal or target. In a non-limiting example, the breakaway point may be the same or substantially the same as the breakaway point described in U.S. patent application Ser. No. 18/142,389, filed on May 2, 2023, titled "APPARATUS AND A METHOD FOR THE IDENTIFICATION OF A BREAKAWAY POINT," which is incorporated by reference herein in its entirety.

With continued reference to FIG. 1, processor 104 may predict a breakaway point using a breakaway machine-learning model. As used in the current disclosure, a "breakaway machine-learning model" is a machine-learning model that sorts inputs into categories or bins of data, outputting the categories or bins of data and/or labels associated therewith. The breakaway machine-learning model may be consistent with the classifier or machine learning model described below in FIG. 2. Inputs to the breakaway machine-learning model may include entity profile 108, entity data 112, function data 116, resource data 120, apportionment data 124, examples of optimized apportionment data 128, operational functions, function rank, assignable function, and the like. Outputs to the breakaway machine-learning model may include a prediction of the breakaway point. Breakaway training data is a plurality of data entries containing a plurality of inputs that are correlated to a plurality of outputs for training a processor by a machine-learning process to correlate optimized apportionment data 128 to examples of breakaway point. Breakaway training data may be received from database 300. Breakaway training data may contain information about entity profile 108, entity data 112, function data 116, resource data 120, apportionment data 124, examples of optimized apportionment data 128, operational functions, function rank, assignable function, and the like. Breakaway training data may correlate optimized apportionment data 128 to an examples of an breakaway point. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 1, processor 104 is configured to determine a resource distribution 140 as a function of the optimized apportionment data 128. As used in the current disclosure, a "resource distribution" is a plan to distribute the resources of entity. A resource distribution 140 may include a plan to determine how to distribute the current resources of the entity. A resource distribution 140 may be generated with the goal of minimizing the current operational functions of the user. In a non-limiting example, resource data 116 indicates that there are 5 employees plus the user who is available to the entity for 10 hours apiece. apportionment data 124 may indicate that there is a total of 55 hours of operational functions and 5 hours of managerial functions. The optimized apportionment data 128 may indicate that each employee may be required to work 10 hours apiece on operational functions and the user is required to do 5 hours of operational functions along with 5 hours of managerial functions. A resource distribution 140 may include a schedule for the completion of all operational functions and managerial functions. A resource distribution 140 may include a function order. A "function order," as used in the current disclosure, is the order in which each task of the plurality of tasks associated with the function data 116 must be completed. In a non-limiting example, a task of building the foundation of building must be done prior to the framing of the building. Generating a function order may additionally comprise an identification of the skill of the available personnel as indicated by personnel data. For instance, if a personnel group comprising concrete worker are unavailable no concrete work may be done until that resource is made available again. Resource distribution 140 may additionally sort tasks associated with function data 116 according to personnel data, task order, resource data 120, and the like. processor 104 determines a resource distribution 140 as a function of at least a resource constraint and at least a timing constraint, as described herein above.

Continuing in reference to FIG. 1, processor 104 may be configured to determine a determine a resource distribution 140 as a function of a feasibility quantifier. A "feasibility quantifier," as used in this disclosure is a qualitative and/or quantitative mathematical relationship correlating the probability of completing a task by an employee given a set of constraints. Processor 104 may identify feasible combinations based on various constraints, wherein processor 104 may find and/or set values for those constraints or add a new constraint in the form of a "feasibility quantifier". In non-limiting illustrative examples, a feasibility quantifier may include scores relating the probability of feasibility for completing a series of tasks, wherein each task has been associated with a probability in relating preparation of a product for a customer order within, for instance, a 15-minute time frame, 30-minute time frame, 1-hour time frame, etc. In further non-limiting illustrative examples, if the employee requires more than a 1-hour time frame the employee may garner scores indicating lower levels of feasibility. Additionally, in non-limiting illustrative examples, if an employee does complete the task within the allotted time period it may garner higher feasibility scores resulting in a sequence of tasks that may be combined in such a way that allows an individual to complete the multiple tasks in succession with one another to fulfill orders within an hour. Feasibility quantifiers may be stored and/or retrieved from a database. Alternatively or additionally, determining the feasibility of a task chain may include resource constraint information, as described in further detail above, wherein the feasibility of an individual completing a first task associated with function data 116 depends upon if that same individual is dependent to a second individual to complete a second task associated with function data 116.

With continued reference to FIG. 1, processor 104 may predict a resource distribution 140 using a distribution machine-learning model. As used in the current disclosure, a "distribution machine-learning model" is a machine-learning model that sorts inputs into categories or bins of data, outputting the categories or bins of data and/or labels associated therewith. Distribution machine-learning model may be consistent with the classifier or machine learning model described below in FIG. 2. Inputs to the distribution machine-learning model may include entity profile 108, entity data 112, function data 116, resource data 120, apportionment data 124, optimized apportionment data 128, operational functions, function rank, assignable function, breakaway point, feasibility quantifiers, examples of resource distributions 140, and the like. Outputs to the distribution machine-learning model may include a prediction of the resource distribution 140. Distribution training data is a plurality of data entries containing a plurality of inputs that are correlated to a plurality of outputs for training a processor by a machine-learning process to correlate optimized apportionment data 128 to examples of resource distribution 140. Distribution training data may be received from database 300. Distribution training data may contain information about entity profile 108, entity data 112, function data 116, resource data 120, apportionment data 124, optimized apportionment data 128, operational functions, function rank, assignable function, breakaway point, feasibility quantifiers, examples of resource distributions 140, and the like. Distribution training data may correlate optimized apportionment data 128 to an examples of an resource distribution 140. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, the processor may be configured to generate a machine-learning model, such as distribution machine-learning model, using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \pm P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. processor 104 may then calculate a likelihood table by calculating probabilities of different data entries and classification labels. processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Still referring to FIG. 1, processor 104 may be configured to generate a machine-learning model, such as distribution machine-learning model, using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm $l=\sqrt{\Sigma_{i=0}^{n} a_i^2}$, where $a_i$ is attribute number experience of the vector. Scaling and/or normalization may function to make vector comparison independent of absolute quantities of attributes, while preserving any dependency on the similarity of attributes; this may, for instance, be advantageous where cases represented in training data are represented by different quantities of samples, which may result in proportionally equivalent vectors with divergent values.

Still referring to FIG. 1, processor 104 may be configured to display the resource distribution 140 using a display device 144. As used in the current disclosure, a "display device" is a device that is used to display a content processor 104. A display device 144 may include a user interface. A "user interface," as used herein, is a means by which a user and a computer system interact; for example through the use of input devices and software. A user interface may include a graphical user interface (GUI), command line interface (CLI), menu-driven user interface, touch user interface, voice user interface (VUI), form-based user interface, any combination thereof, and the like. A user interface may include a smartphone, smart tablet, desktop, or laptop operated by the user. In an embodiment, the user interface may include a graphical user interface. A "graphical user interface (GUI)," as used herein, is a graphical form of user interface that allows users to interact with electronic devices. In some embodiments, GUI may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Information contained in user interface may be directly influenced using graphical control elements such as widgets. A "widget," as used herein, is a user control element that allows a user to control and change the appearance of elements in the user interface. In this context a widget may refer to a generic GUI element such as a check box, button, or scroll bar to an instance of that element, or to a customized collection of such elements used for a specific function or application (such as a dialog box for users to customize their computer screen appearances). User interface controls may include software components that a user interacts with through direct manipulation to read or edit information displayed through user interface. Widgets may be used to display lists of related items, navigate the system using links, tabs, and manipulate data using check boxes, radio boxes, and the like.

Figure 2:
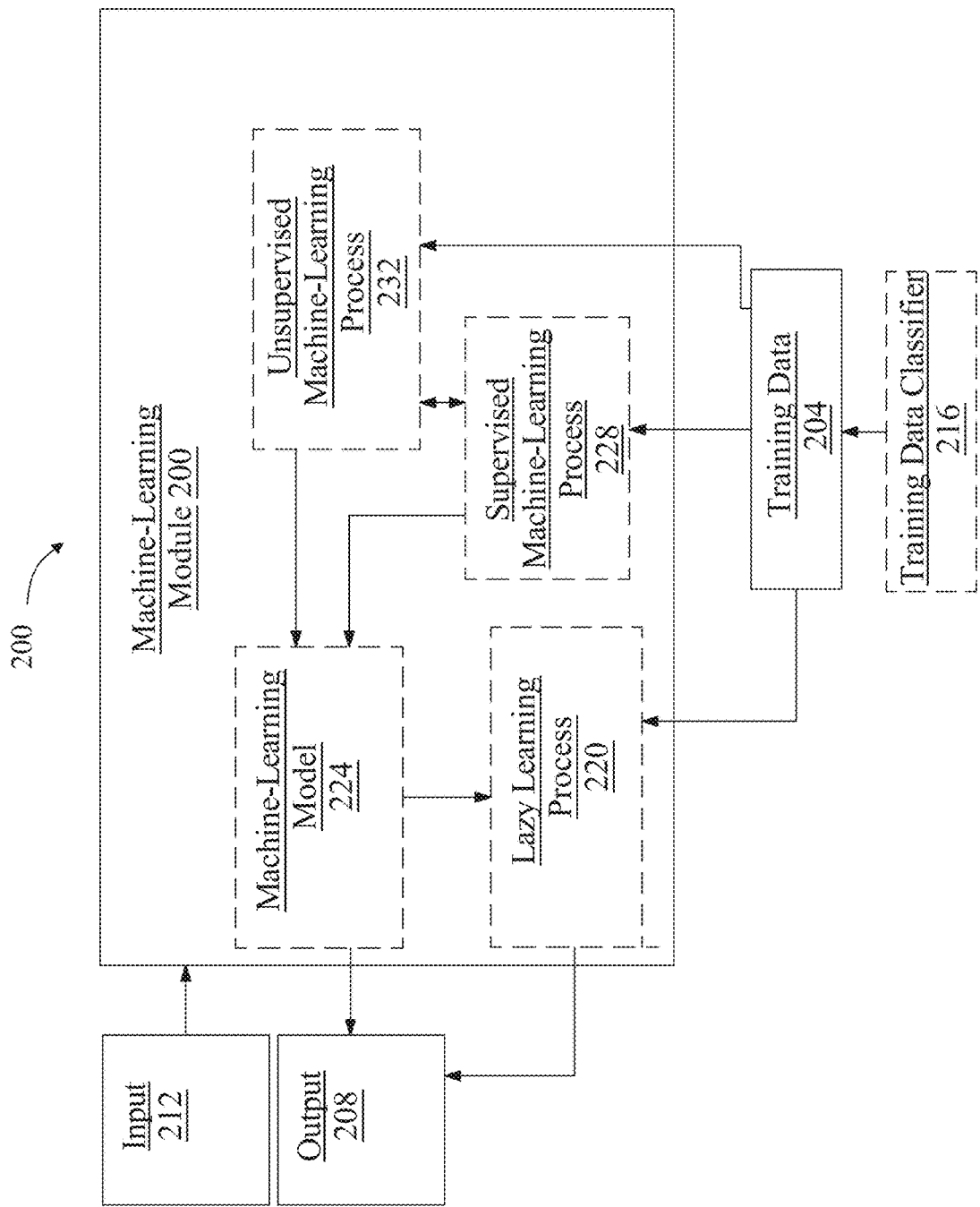
FIG. 2 is a block diagram of an exemplary machine-learning process.

Referring now to FIG. 2, an exemplary embodiment of a machine-learning module 200 that may perform one or more machine-learning processes as described in this disclosure is illustrated. Machine-learning modules may perform determinations, classification, and/or analysis steps, methods, processes, or the like as described in this disclosure using machine-learning processes. A "machine learning process," as used in this disclosure, is a process that automatedly uses training data 204 to generate an algorithm that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below.

Training data 204 used by machine-learning module 200 may correlate any input data as described in this disclosure to any output data as described in this disclosure.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 2, machine-learning module 200 may be configured to perform a lazy-learning process 220 and/or protocol, which may alternatively be referred to as a "lazy loading" or "call-when-needed" process and/or protocol, maybe a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs and outputs as described above in this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 3:
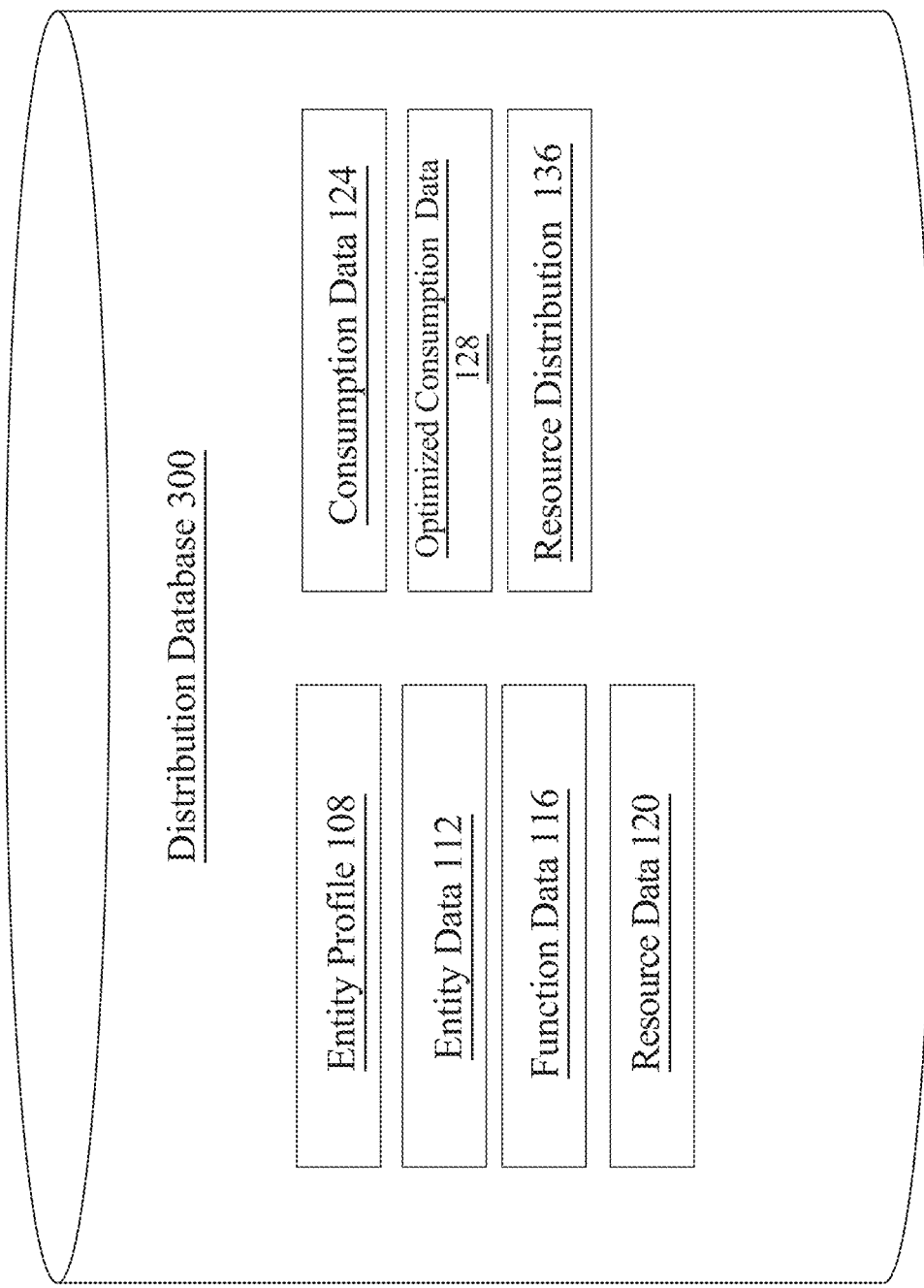
FIG. 3 is a block diagram of an exemplary embodiment of a distribution database.

Now referring to FIG. 3, an exemplary distribution database 300 is illustrated by way of block diagram. In an embodiment, any past or present versions of data disclosed herein may be stored within distribution database 300 including but not limited to: entity profile 108, entity data 112, function data 116, resource data 120, apportionment data 124, optimized apportionment data 128, operational functions, function rank, assignable function, breakaway point, feasibility quantifiers, examples of resource distributions 140, and the like. Processor 104 may be communicatively connected with distribution database 300. For example, in some cases, database 300 may be local to processor 104. Alternatively or additionally, in some cases, database 300 may be remote to processor 104 and communicative with processor 104 by way of one or more networks. Network may include, but not limited to, a cloud network, a mesh network, or the like. By way of example, a "cloud-based" system, as that term is used herein, can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connect directly, dynamically, and non-hierarchically to as many other computing devices as possible. A "network topology" as used in this disclosure is an arrangement of elements of a communication network. Distribution database 300 may be implemented, without limitation, as a relational database, a key-value retrieval database such as a NOSQL database, or any other format or structure for use as a database that a person skilled in the art would recognize as suitable upon review of the entirety of this disclosure. Distribution database 300 may alternatively or additionally be implemented using a distributed data storage protocol and/or data structure, such as a distributed hash table or the like. Distribution database 300 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Figure 4:
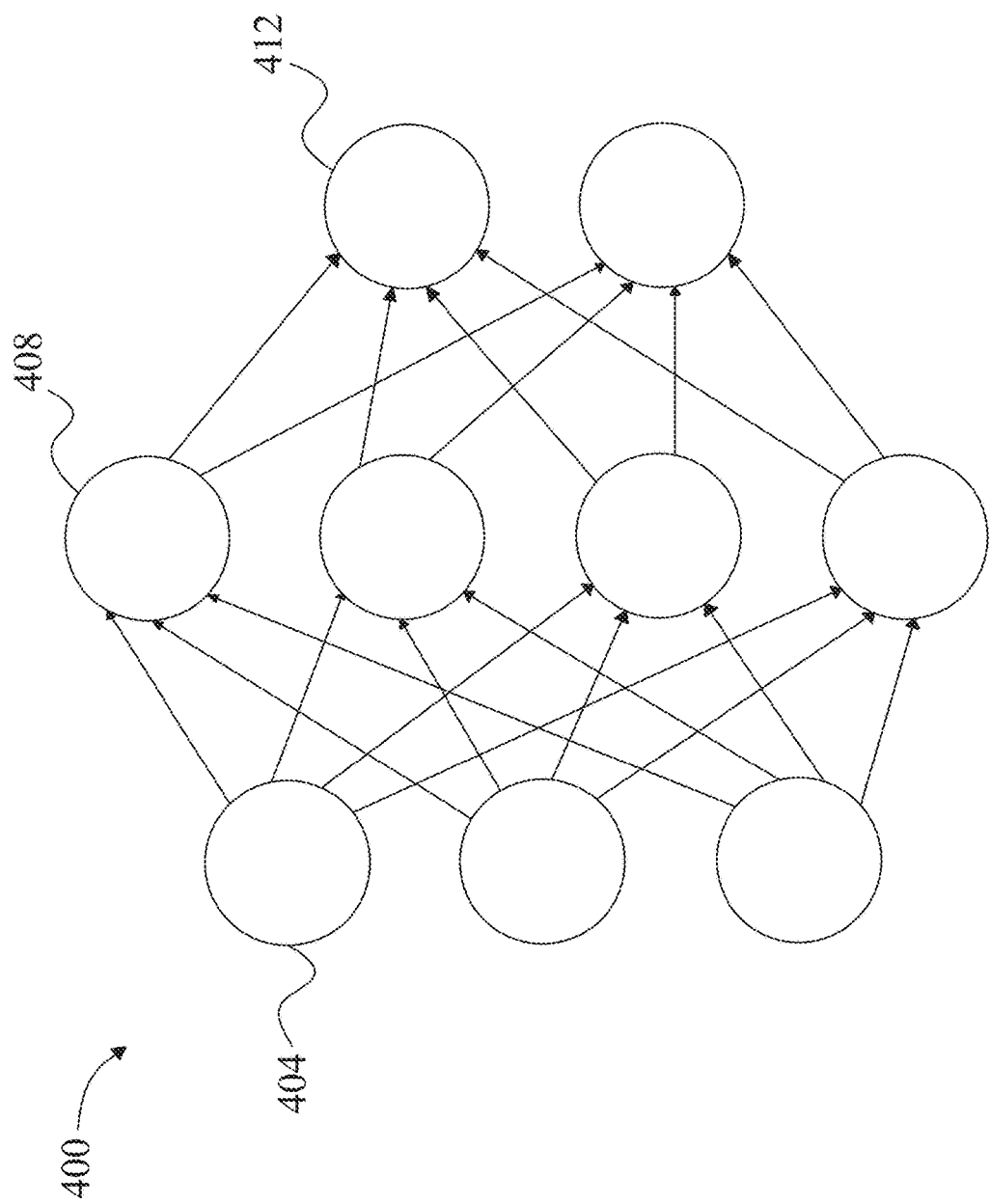
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
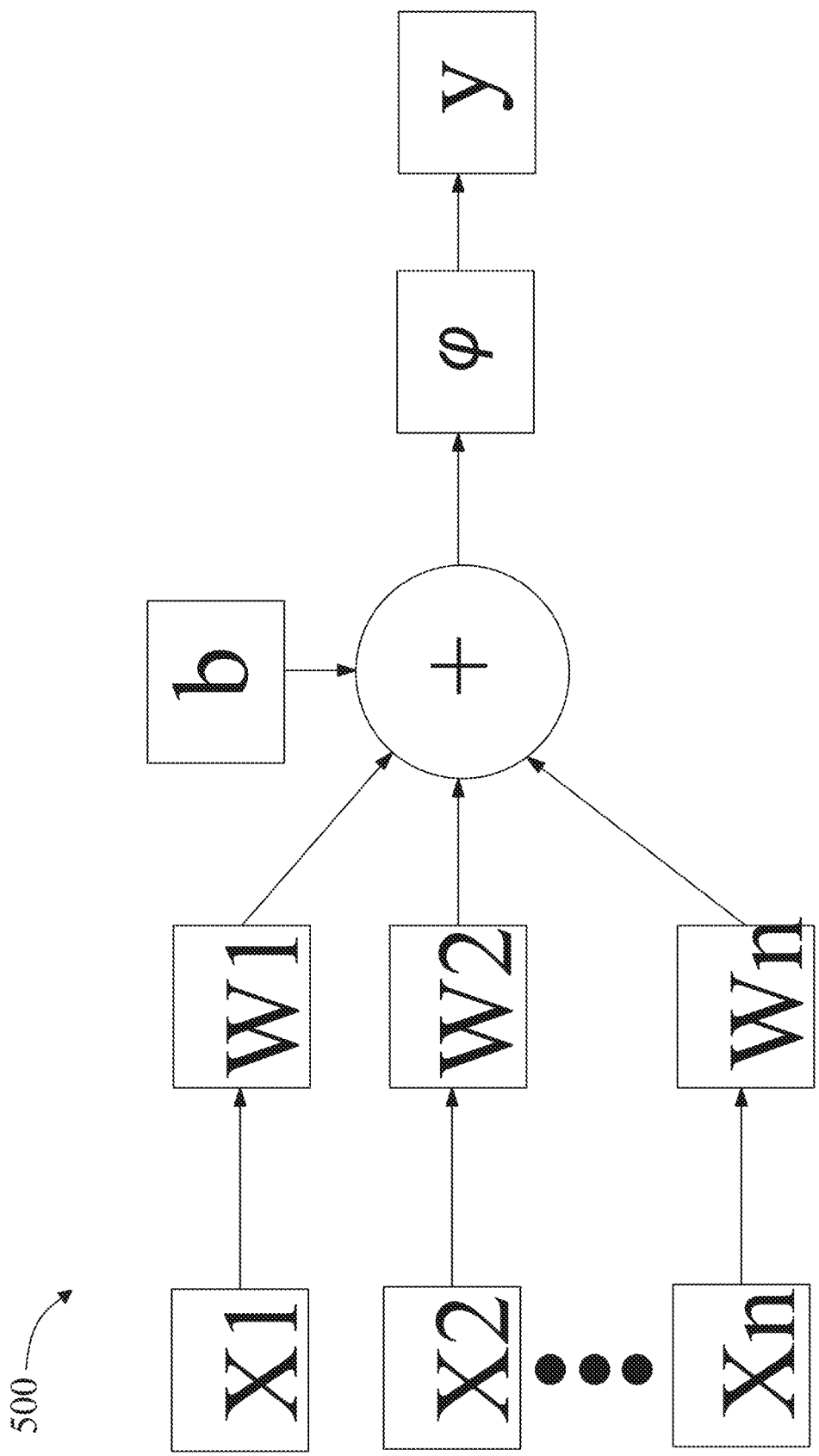
FIG. 5 is a diagram of an exemplary embodiment of a node of a neural network.

Referring now to FIG. 5, an exemplary embodiment of a node of a neural network is illustrated. A node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
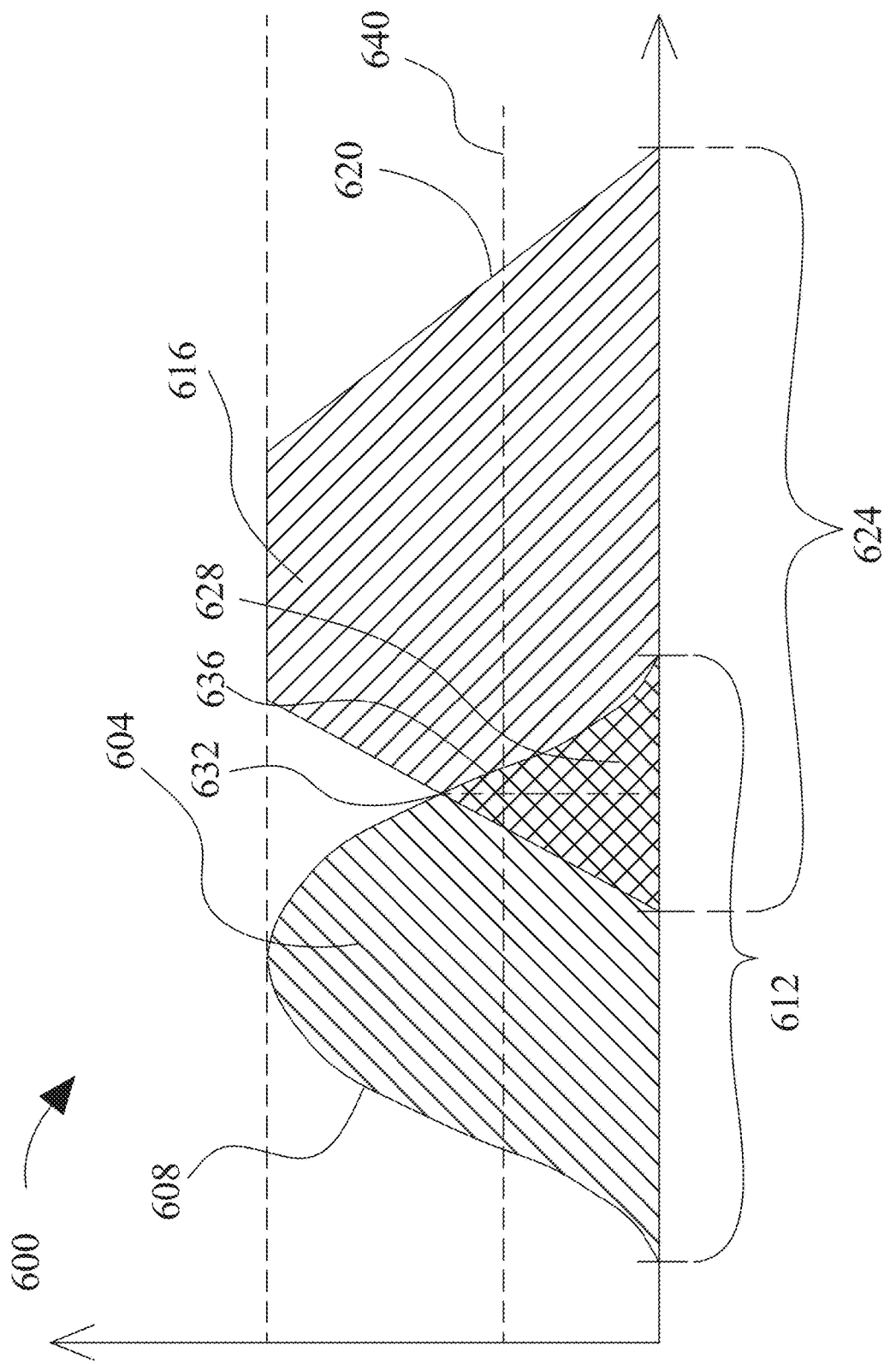
FIG. 6 an illustration exemplary embodiment of fuzzy set comparison.

Now referring to FIG. 6, an exemplary embodiment of fuzzy set comparison 600 is illustrated. In a non-limiting embodiment, the fuzzy set comparison. In a non-limiting embodiment, fuzzy set comparison 600 may be consistent with fuzzy set comparison in FIG. 1. In another non-limiting the fuzzy set comparison 600 may be consistent with the name/version matching as described herein. For example and without limitation, the parameters, weights, and/or coefficients of the membership functions may be tuned using any machine-learning methods for the name/version matching as described herein. In another non-limiting embodiment, the fuzzy set may represent apportionment data 124 and resource data 120 from FIG. 1.

Alternatively or additionally, and still referring to FIG. 6, fuzzy set comparison 600 may be generated as a function of determining data compatibility threshold. The compatibility threshold may be determined by a computing device. In some embodiments, a computing device may use a logic comparison program, such as, but not limited to, a fuzzy logic model to determine the compatibility threshold and/or version authenticator. Each such compatibility threshold may be represented as a value for a posting variable representing the compatibility threshold, or in other words a fuzzy set as described above that corresponds to a degree of compatibility and/or allowability as calculated using any statistical, machine-learning, or other method that may occur to a person skilled in the art upon reviewing the entirety of this disclosure. In some embodiments, determining the compatibility threshold and/or version authenticator may include using a linear regression model. A linear regression model may include a machine learning model. A linear regression model may map statistics such as, but not limited to, frequency of the same range of version numbers, and the like, to the compatibility threshold and/or version authenticator. In some embodiments, determining the compatibility threshold of any posting may include using a classification model. A classification model may be configured to input collected data and cluster data to a centroid based on, but not limited to, frequency of appearance of the range of versioning numbers, linguistic indicators of compatibility and/or allowability, and the like. Centroids may include scores assigned to them such that the compatibility threshold may each be assigned a score. In some embodiments, a classification model may include a K-means clustering model. In some embodiments, a classification model may include a particle swarm optimization model. In some embodiments, determining a compatibility threshold may include using a fuzzy inference engine. A fuzzy inference engine may be configured to map one or more compatibility threshold using fuzzy logic. In some embodiments, a plurality of computing devices may be arranged by a logic comparison program into compatibility arrangements. A "compatibility arrangement" as used in this disclosure is any grouping of objects and/or data based on skill level and/or output score. Membership function coefficients and/or constants as described above may be tuned according to classification and/or clustering algorithms. For instance, and without limitation, a clustering algorithm may determine a Gaussian or other distribution of questions about a centroid corresponding to a given compatibility threshold and/or version authenticator, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Still referring to FIG. 6, inference engine may be implemented according to input apportionment data 124 and resource data 120. For instance, an acceptance variable may represent a first measurable value pertaining to the classification of a apportionment data 124 to resource data 120. Continuing the example, an output variable may represent the optimized apportionment data 128 tailored to the entity profile 108. In an embodiment, a apportionment data 124 and/or resource data 120 may be represented by their own fuzzy set. In other embodiments, an evaluation factor may be represented as a function of the intersection two fuzzy sets as shown in FIG. 6, An inference engine may combine rules, such as any semantic versioning, semantic language, version ranges, and the like thereof. The degree to which a given input function membership matches a given rule may be determined by a triangular norm or "T-norm" of the rule or output function with the input function, such as min (a, b), product of a and b, drastic product of a and b, Hamacher product of a and b, or the like, satisfying the rules of commutativity (T(a, b)=T(b, a)), monotonicity: (T(a, b)≤T (c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$(x, a, b, c) = \begin{cases} 0, \text{ for } x > c \text{ and } x > a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 604 may represent any value or combination of values as described above, including any apportionment data 124 and resource data 120. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 636 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, the optimized apportionment data 128 may indicate a sufficient degree of overlap with fuzzy set representing a apportionment data 124 and resource data 120 for combination to occur as described above. Each threshold may be established by one or more user inputs. Alternatively or additionally, each threshold may be tuned by a machine-learning and/or statistical process, for instance and without limitation as described in further detail below.

In an embodiment, a degree of match between fuzzy sets may be used to rank one resource against another. For instance, if both a apportionment data 124 and resource data 120 have fuzzy sets, the optimized apportionment data 128 may be generated by having a degree of overlap exceeding a predictive threshold, processor 104 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple notifications may be presented to a user in order of ranking.

Figure 7:
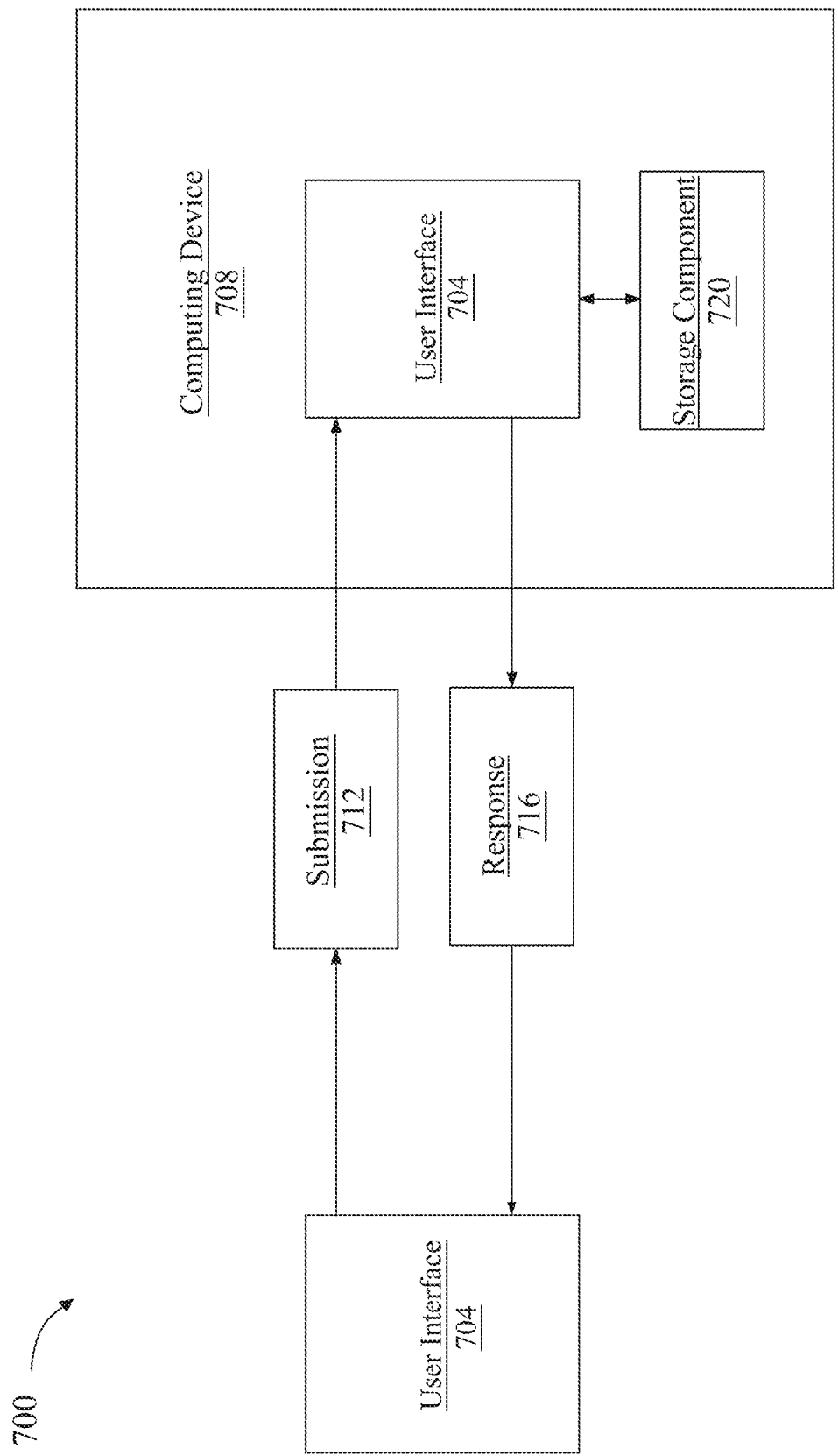
FIG. 7 is an illustration of an exemplary embodiment of a chatbot.

Referring to FIG. 7, a chatbot system 700 is schematically illustrated. According to some embodiments, a user interface 704 may be communicative with a computing device 708 that is configured to operate a chatbot. In some cases, user interface 704 may be local to computing device 708. Alternatively or additionally, in some cases, user interface 704 may remote to computing device 708 and communicative with the computing device 708, by way of one or more networks, such as without limitation the internet. Alternatively or additionally, user interface 704 may communicate with user device 708 using telephonic devices and networks, such as without limitation fax machines, short message service (SMS), or multimedia message service (MMS). Commonly, user interface 704 communicates with computing device 708 using text-based communication, for example without limitation using a character encoding protocol, such as American Standard for Information Interchange (ASCII). Typically, a user interface 704 conversationally interfaces a chatbot, by way of at least a submission 712, from the user interface 708 to the chatbot, and a response 716, from the chatbot to the user interface 704. In many cases, one or both of submission 712 and response 716 are text-based communication. Alternatively or additionally, in some cases, one or both of submission 712 and response 716 are audio-based communication.

Continuing in reference to FIG. 7, a submission 712 once received by computing device 708 operating a chatbot, may be processed by a processor. In some embodiments, processor processes a submission 7112 using one or more of keyword recognition, pattern matching, and natural language processing. In some embodiments, processor employs real-time learning with evolutionary algorithms. In some cases, processor may retrieve a pre-prepared response from at least a storage component 720, based upon submission 712. Alternatively or additionally, in some embodiments, processor communicates a response 716 without first receiving a submission 712, thereby initiating conversation. In some cases, processor communicates an inquiry to user interface 704; and the processor is configured to process an answer to the inquiry in a following submission 712 from the user interface 704. In some cases, an answer to an inquiry present within a submission 712 from a user device 704 may be used by computing device 708 as an input to another function.

With continued reference to FIG. 7, A chatbot may be configured to provide a user with a plurality of options as an input into the chatbot. Chatbot entries may include multiple choice, short answer response, true or false responses, and the like. A user may decide on what type of chatbot entries are appropriate. In some embodiments, the chatbot may be configured to allow the user to input a freeform response into the chatbot. The chatbot may then use a decision tree, data base, or other data structure to respond to the users entry into the chatbot as a function of a chatbot input. As used in the current disclosure, "Chatbot input" is any response that a candidate or employer inputs in to a chatbot as a response to a prompt or question.

With continuing reference to FIG. 7, computing device 708 may be configured to the respond to a chatbot input using a decision tree. A "decision tree," as used in this disclosure, is a data structure that represents and combines one or more determinations or other computations based on and/or concerning data provided thereto, as well as earlier such determinations or calculations, as nodes of a tree data structure where inputs of some nodes are connected to outputs of others. Decision tree may have at least a root node, or node that receives data input to the decision tree, corresponding to at least a candidate input into a chatbot. Decision tree has at least a terminal node, which may alternatively or additionally be referred to herein as a "leaf node," corresponding to at least an exit indication; in other words, decision and/or determinations produced by decision tree may be output at the at least a terminal node. Decision tree may include one or more internal nodes, defined as nodes connecting outputs of root nodes to inputs of terminal nodes. Computing device 708 may generate two or more decision trees, which may overlap; for instance, a root node of one tree may connect to and/or receive output from one or more terminal nodes of another tree, intermediate nodes of one tree may be shared with another tree, or the like.

Still referring to FIG. 7, computing device 708 may build decision tree by following relational identification; for example, relational indication may specify that a first rule module receives an input from at least a second rule module and generates an output to at least a third rule module, and so forth, which may indicate to computing device 708 an in which such rule modules will be placed in decision tree. Building decision tree may include recursively performing mapping of execution results output by one tree and/or subtree to root nodes of another tree and/or subtree, for instance by using such execution results as execution parameters of a subtree. In this manner, computing device 708 may generate connections and/or combinations of one or more trees to one another to define overlaps and/or combinations into larger trees and/or combinations thereof. Such connections and/or combinations may be displayed by visual interface to user, for instance in first view, to enable viewing, editing, selection, and/or deletion by user; connections and/or combinations generated thereby may be highlighted, for instance using a different color, a label, and/or other form of emphasis aiding in identification by a user. In some embodiments, subtrees, previously constructed trees, and/or entire data structures may be represented and/or converted to rule modules, with graphical models representing them, and which may then be used in further iterations or steps of generation of decision tree and/or data structure. Alternatively or additionally subtrees, previously constructed trees, and/or entire data structures may be converted to APIs to interface with further iterations or steps of methods as described in this disclosure. As a further example, such subtrees, previously constructed trees, and/or entire data structures may become remote resources to which further iterations or steps of data structures and/or decision trees may transmit data and from which further iterations or steps of generation of data structure receive data, for instance as part of a decision in a given decision tree node.

Continuing to refer to FIG. 7, decision tree may incorporate one or more manually entered or otherwise provided decision criteria. Decision tree may incorporate one or more decision criteria using an application programmer interface (API). Decision tree may establish a link to a remote decision module, device, system, or the like. Decision tree may perform one or more database lookups and/or look-up table lookups. Decision tree may include at least a decision calculation module, which may be imported via an API, by incorporation of a program module in source code, executable, or other form, and/or linked to a given node by establishing a communication interface with one or more exterior processes, programs, systems, remote devices, or the like; for instance, where a user operating system has a previously existent calculation and/or decision engine configured to make a decision corresponding to a given node, for instance and without limitation using one or more elements of domain knowledge, by receiving an input and producing an output representing a decision, a node may be configured to provide data to the input and receive the output representing the decision, based upon which the node may perform its decision.

Figure 8:
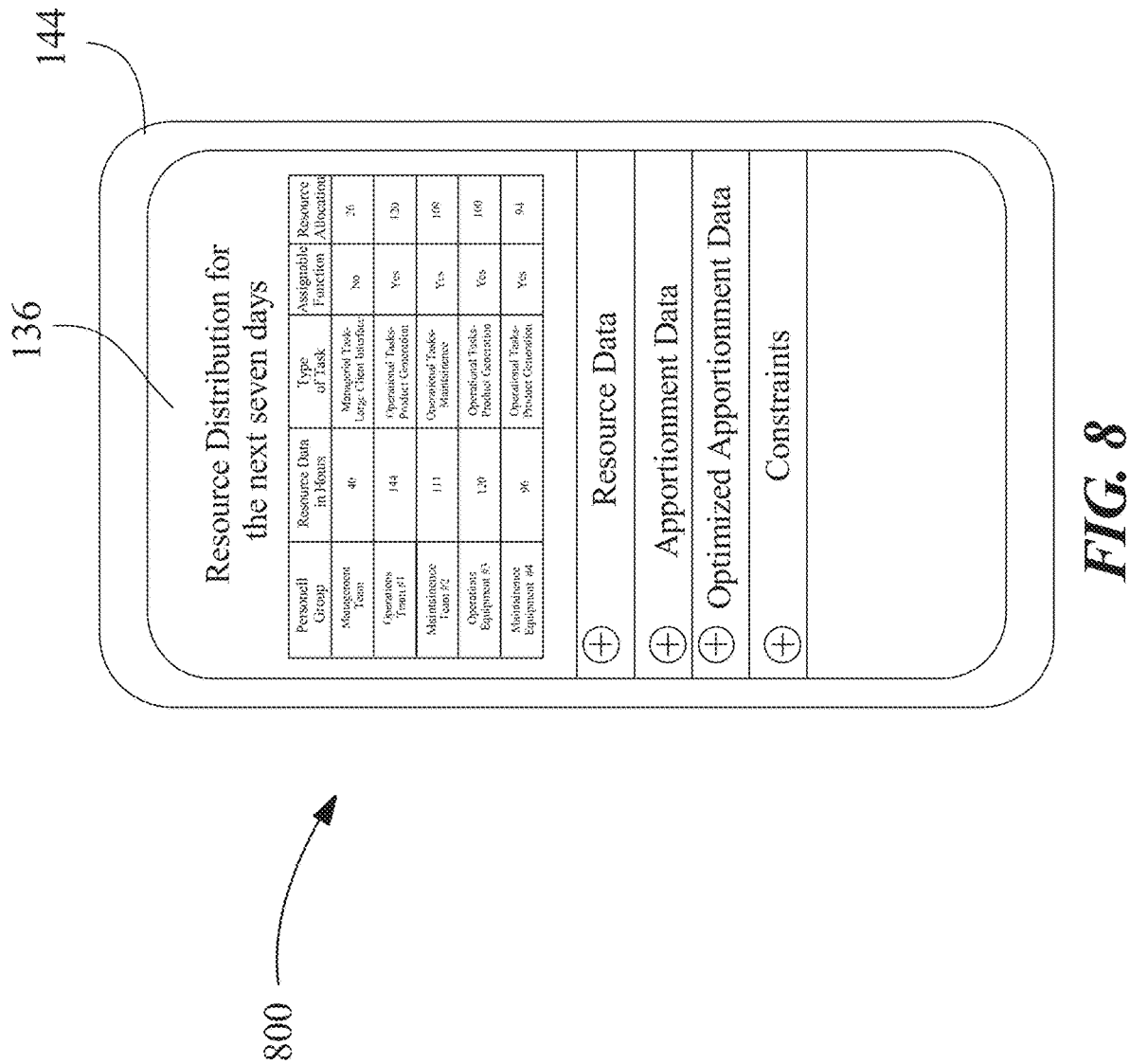
FIG. 8 is an exemplary embodiment of a user interface component.

Now referring to FIG. 8, an exemplary representation of a user interface component is presented. User interface 800 may include a display device such as display device 144. In an embodiment, user interface 800 may display a resource distribution 136, which may include a listing of resource data 116 and function data 120. In an embodiment, user interface 800 may display a detailed account of how the resource data 116 is applied to the function data 120. In an example, without limitations, user interface 800 may display a list of personnel or a group of personnel that can perform a task, and the list of personnel may include the constraints 136 associated with each employee. In some embodiments, user interface 800 may display an identification of operational functions and managerial functions as determined by processor 104 using function data 120. In a non-limiting example, may display a task of "Equipment maintenance," and identification that the task can be delegated to personnel other than the user. A user may additionally use the user interface 800 to denote when tasks have been completed and the number of resources consumed by that task. In some embodiments, the data displayed by user interface 800 may change as the underlying data changes. As the optimized apportionment data 128 changes the resource distribution 140 that is displayed by user interface 800 may also change.

Figure 9:
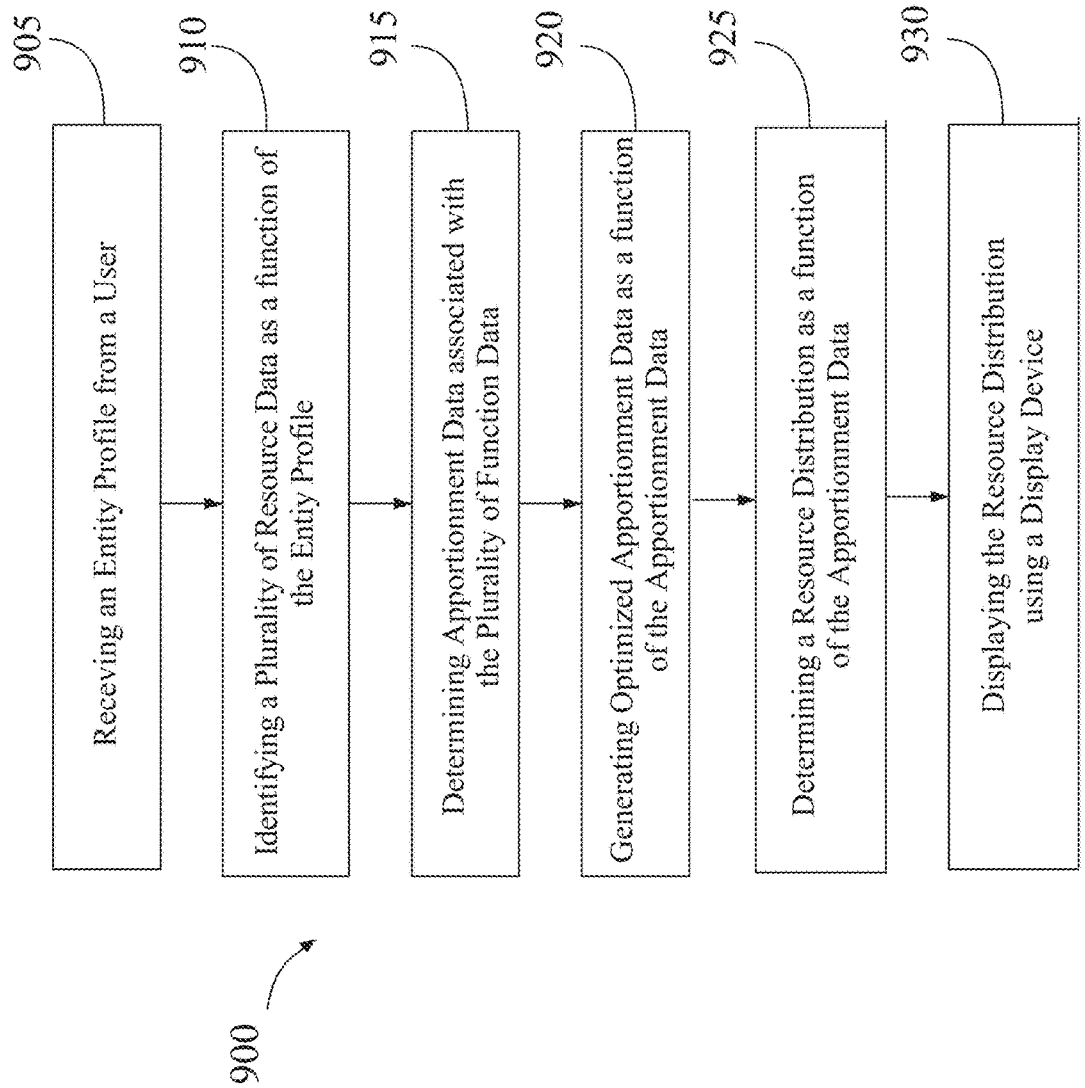
FIG. 9 is a flow diagram of an exemplary method for determining resource distribution.

Referring now to FIG. 9, a flow diagram of an exemplary method 900 for the generation of a plurality of personal targets is illustrated. At step 905, method 900 includes extracting, using at least a processor, an entity profile from a user, wherein the entity profile comprises a plurality of function data. This may be implemented as described and with reference to FIGS. 1-9. In some embodiments, extracting the entity profile may comprise extracting the entity profile using a web crawler or a chatbot. In some embodiments, the memory may further instruct the processor to generate a function rank for each function associated with the plurality of function data.

Still referring to FIG. 9, At step 910, method 900 includes identifying, using the at least a processor, a plurality of resource data as a function of the entity profile. This may be implemented as described and with reference to FIGS. 1-9. In some embodiments, the plurality of resource data may comprise time associated with personnel of the entity.

Still referring to FIG. 9, At step 915, method 900 includes calculating, using the at least a processor, apportionment data associated with the plurality of function data as a function of the plurality of resource data. This may be implemented as described and with reference to FIGS. 1-9. In some embodiments, the apportionment data may comprise an estimated completion time associated with the plurality of function data.

Still referring to FIG. 9, At step 920, method 900 includes generating, using the at least a processor, optimized apportionment data as a function of the apportionment data and the plurality of resource data. This may be implemented as described and with reference to FIGS. 1-9. In some embodiments, generating optimized apportionment data may comprise generating optimized apportionment data as a function of the function rank. In other embodiments, generating optimized apportionment data may comprise generating optimized apportionment data using an optimization classifier. The optimization classifier may be configured to be trained using optimization training data, wherein the optimization training data contains a plurality of data entries containing the apportionment data and the entity model as inputs correlated to the optimized apportionment data as outputs.

Still referring to FIG. 9, At step 925, method 900 includes determining, using the at least a processor, a resource distribution as a function of the optimized apportionment data. This may be implemented as described and with reference to FIGS. 1-9.

Still referring to FIG. 9, At step 930, method 900 includes displaying using the display device the resource distribution. This may be implemented as described and with reference to FIGS. 1-9.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
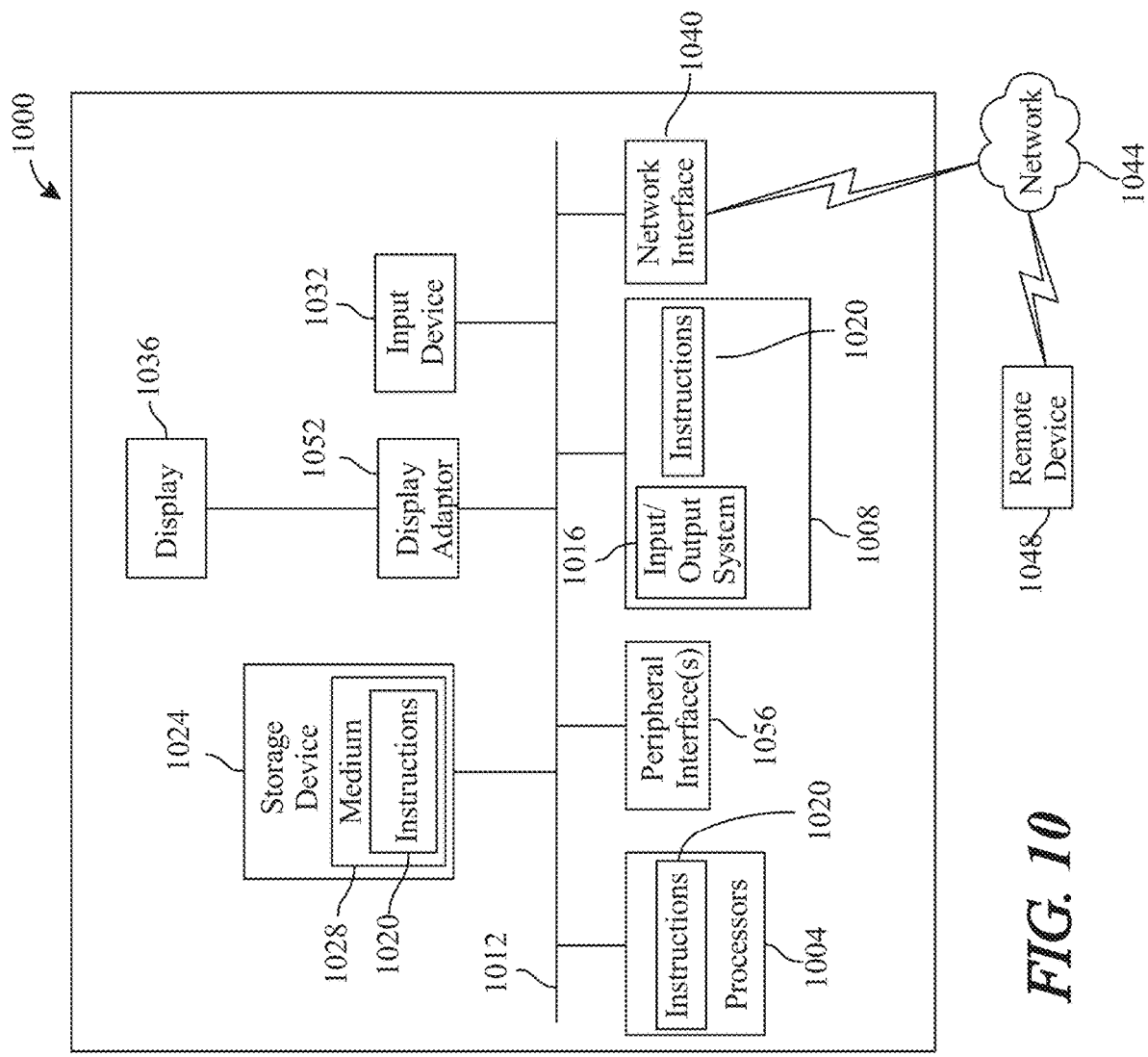
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 13104 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for determining resource distribution, wherein the apparatus comprises: at least a processor; and a memory communicatively connected to the at least a processor, the memory containing instructions configuring the at least a processor to:
receive an entity profile from a user, wherein the entity profile comprises a plurality of function data;
identify a plurality of resource data as a function of the entity profile, wherein the plurality of resource data comprises outlier clusters which represent an area of competence;
determine apportionment data associated with the plurality of function data as a function of the plurality of resource data;
generate optimized apportionment data as a function of the apportionment data and the plurality of resource data, wherein generating the optimized apportionment data comprises:
identifying at least one constraint associated with the apportionment data and the plurality of resource data using a constraint machine learning model, wherein identifying the at least one constraint further comprises:
receive constraint training data, wherein the constraint training data is a data set that correlates apportionment data to historical constraints;
train, iteratively, the constraint machine learning model using the constraint training data, wherein training the constraint machine learning model includes retraining the constraint machine learning model with feedback from previous iterations of the constraint machine learning model; and
identify, as a function of the trained constraint machine learning model, the at least one constraint;
generating the optimized apportionment data as a function of the at least one constraint;
predict a breakaway point as a function of the optimized apportionment data, wherein predicting the breakaway point comprises:
receiving breakaway training data correlating optimized apportionment data to a plurality of breakaway points;
training a breakaway machine-learning model using the breakaway training data;
outputting, by the breakaway machine-learning model, the breakaway point, wherein the breakaway point determines a point in time a goal of an entity will be achieved;
determine a resource distribution as a function of the optimized apportionment data and the breakaway point, wherein determining the resource distribution comprises unitizing a distribution machine-learning model trained to correlate the optimized apportionment data and the breakaway a plurality of resource distributions; and present the resource distribution using a display device.

2. The apparatus of claim 1, wherein the memory further instructs the processor to generate a function rank for each function associated with the plurality of function data.

3. The apparatus of claim 1, wherein generating optimized apportionment data comprises generating optimized apportionment data as a function of the function rank.

4. The apparatus of claim 1, wherein generating the optimized apportionment data comprises generating the optimized apportionment data using an optimization classifier.

5. The apparatus of claim 4, wherein generating the optimized apportionment data using an optimization classifier comprises:
training the optimization classifier using optimization training data, wherein the optimization training data contains a plurality of data entries containing the apportionment data and the plurality of resource data as inputs correlated to the optimized apportionment data as outputs; and generate optimized apportionment data as a function of the apportionment data and the entity model using the trained optimization classifier.

6. The apparatus of claim 1, wherein extracting the entity profile comprises extracting the entity profile using a web crawler.

7. The apparatus of claim 1, wherein extracting the entity profile comprises extracting the entity profile using a chatbot.

8. The apparatus of claim 1, wherein the plurality of resource data comprises time associated with personnel of the entity.

9. The apparatus of claim 1, wherein the apportionment data comprises an estimated completion time associated with the plurality of function data.

10. A method for determining resource distribution, wherein the method comprises:
receiving, using at least a processor, an entity profile from a user, wherein the entity profile comprises a plurality of function data;
identifying, using the at least a processor, a plurality of resource data as a function of the entity profile, wherein the plurality of resource data comprises outlier clusters which represent an area of competence;
determining, using the at least a processor, apportionment data associated with the plurality of function data as a function of the plurality of resource data;
generating, using the at least a processor, optimized apportionment data as a function of the apportionment data and the plurality of resource data, wherein generating the optimized apportionment data comprises:
identifying at least one constraint associated with the apportionment data and the plurality of resource data using a constraint machine learning model, wherein identifying the at least one constraint further comprises:
receive constraint training data, wherein the constraint training data is a data set that correlates apportionment data to historical constraints;
train, iteratively, the constraint machine learning model using the constraint training data, wherein training the constraint machine learning model includes retraining the constraint machine learning model with feedback from previous iterations of the constraint machine learning model; and
identify, as a function of the trained constraint machine learning model, the at least one constraint;
generating the optimized apportionment data as a function of the at least one constraint;

predicting, using the at least a processor, a breakaway point as a function of the optimized apportionment data, wherein predicting the break point comprises:
receiving breakaway training data correlating optimized apportionment data to a plurality of breakaway points;
training a breakaway machine-learning model using the breakaway training data;
outputting, by the breakaway machine-learning model, the breakaway point, wherein the breakaway point determines a point in time a goal of an entity will be achieved;
determining, using the at least a processor, a resource distribution as a function of the optimized apportionment data and the breakaway point, wherein determining the resource distribution comprises unitizing a distribution machine-learning model trained to correlate the optimized apportionment data and the breakaway a plurality of resource distributions; and presenting using the display device the resource distribution.

11. The method of claim 10, wherein the memory further instructs the processor to generate a function rank for each function associated with the plurality of function data.

12. The method of claim 10, wherein generating optimized apportionment data comprises generating optimized apportionment data as a function of the function rank.

13. The method of claim 10, wherein generating the optimized apportionment data comprises generating the optimized apportionment data using an optimization classifier.

14. The method of claim 13, wherein generating the optimized apportionment data using an optimization classifier comprises:
training the optimization classifier using optimization training data, wherein the optimization training data contains a plurality of data entries containing the apportionment data and the plurality of resource data as inputs correlated to the optimized apportionment data as outputs; and
generate optimized apportionment data as a function of the apportionment data and the entity model using the trained optimization classifier.

15. The method of claim 10, wherein extracting the entity profile comprises extracting the entity profile using a web crawler.

16. The method of claim 10, wherein extracting the entity profile comprises extracting the entity profile using a chatbot.

17. The method of claim 10, wherein the plurality of resource data comprises time associated with age of the entity.

18. The method of claim 10, wherein the apportionment data comprises an estimated completion time associated with the plurality of function data.

* * * * *